United States Patent
Ashkenazi (10) Patent No.: US 9,239,920 B2
(45) Date of Patent: Jan. 19, 2016

(54) GENERATION OF WORKING SECURITY KEY BASED ON SECURITY PARAMETERS

(71) Applicant: QUALCOMM Incorporated, San Diego, CA (US)

(72) Inventor: Asaf Ashkenazi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 16 days.

(21) Appl. No.: 13/868,859

(22) Filed: Apr. 23, 2013

(65) Prior Publication Data

US 2014/0317417 A1 Oct. 23, 2014

(51) Int. Cl.
| | |
|---|---|
| *G06F 21/00* | (2013.01) |
| *G06F 21/51* | (2013.01) |
| *H04L 9/08* | (2006.01) |
| *H04W 12/10* | (2009.01) |
| *H04L 9/32* | (2006.01) |
| *G06F 21/57* | (2013.01) |
| *G06F 21/79* | (2013.01) |
| *H04L 29/06* | (2006.01) |
| *H04W 12/12* | (2009.01) |
| *H04W 88/02* | (2009.01) |

(52) U.S. Cl.
CPC .............. *G06F 21/51* (2013.01); *H04L 9/0866* (2013.01); *H04W 12/10* (2013.01); *G06F 21/575* (2013.01); *G06F 21/79* (2013.01); *H04L 9/3247* (2013.01); *H04L 63/123* (2013.01); *H04L 2463/061* (2013.01); *H04W 12/12* (2013.01); *H04W 88/02* (2013.01)

(58) Field of Classification Search
CPC .................................. G06F 21/72; G06F 21/62
USPC ......................................................... 713/189
See application file for complete search history.

(56) References Cited

U.S. PATENT DOCUMENTS

| | | | |
|---|---|---|---|
| 7,134,019 B2 | 11/2006 | Shelest et al. | |
| 7,216,238 B2 * | 5/2007 | Herrod et al. | ................. 713/185 |
| 8,254,578 B2 * | 8/2012 | Paksoy et al. | ................. 380/277 |
| 8,307,215 B2 | 11/2012 | Camiel | |
| 2002/0194477 A1 * | 12/2002 | Arakawa et al. | ............. 713/170 |

(Continued)

OTHER PUBLICATIONS

International Search Report and Written Opinion—PCT/US2014/034414—ISA/EPO—Jul. 24, 2014.

*Primary Examiner* — Kambiz Zand
*Assistant Examiner* — Thanh Le
(74) *Attorney, Agent, or Firm* — Blakely Sokoloff Taylor & Zafman, LLP (57) ABSTRACT

Techniques for improving security of an electronics device are disclosed. In one aspect of the present disclosure, security of a device may be improved by generating a working key based on a hardware secret key and at least one security parameter of the device, e.g., with a key derivation function. The security parameter(s) may be related to software to be authenticated on the device and/or other aspects of security for the wireless device. The security parameter(s) may indicate whether the software is authorized and/or at least one operating function authorized for the software. At least one security function may be performed for the device based on the working key. For example, the working key may be used to encrypt, sign, decrypt, or verify data for the device. The working key may be used directly or indirectly by the software for the at least one security function.

19 Claims, 7 Drawing Sheets

(56) References Cited

U.S. PATENT DOCUMENTS

| | | |
|---|---|---|
| 2003/0163719 A1 | 8/2003 | Ebihara |
| 2006/0117181 A1* | 6/2006 | Brickell ..................... 713/176 |
| 2009/0202069 A1 | 8/2009 | Cox et al. |
| 2009/0307499 A1 | 12/2009 | Senda |
| 2010/0014670 A1 | 1/2010 | Li et al. |
| 2011/0078449 A1 | 3/2011 | Starr et al. |
| 2011/0299679 A1 | 12/2011 | Yamaguchi et al. |
| 2012/0201379 A1* | 8/2012 | Fuchs et al. .................. 380/255 |

* cited by examiner

GENERATION OF WORKING SECURITY KEY BASED ON SECURITY PARAMETERS

BACKGROUND

I. Field

The present disclosure relates generally to electronics, and more specifically to techniques for providing security on an electronics device.

II. Background

An electronics device (e.g., a cellular phone or a smartphone) typically operates based on software that controls the operation of hardware on the device and supports various functions of the device. A security mechanism (e.g., a secure boot) may be employed to ensure that only software that has been authorized for the device can be executed on the device. However, the device may be vulnerable to malicious attack (e.g., during manufacturing) prior to activation of the security mechanism on the device. During this vulnerable time period, unauthorized software may be maliciously loaded onto the device and executed by the device to access security information (e.g., security keys) on the device and/or to manipulate data using the security information.

SUMMARY

Techniques for improving security of an electronics device are disclosed herein. In an aspect of the present disclosure, security of a device may be improved by generating a working key based on a hardware secret key as well as at least one security parameter of the device. The working key (instead of the hardware secret key) may be used to perform security functions (e.g., encrypt and decrypt data) on the device.

In an exemplary design, a working key may be generated based on at least one security parameter and a secret key of a device, e.g., with a key derivation function. The at least one security parameter may be related to software to be authenticated on the device and/or other aspects of security for the device. At least one security function may be performed for the device based on the working key. For example, the working key may be used to encrypt, sign, decrypt, or verify data for the device. The working key may be used directly or indirectly by the software for the at least one security function.

The at least one security parameter may control various aspects of security for the device. For example, the at least one security parameter may determine whether the software is authorized for execution on the device, whether at least one operating function is authorized for the software, etc. In one design, the at least one security parameter may include a public key used to determine whether the software is authorized for the device. The public key may correspond to a private key used to sign the software. The at least one security parameter may also comprise other types of information.

Various aspects and features of the disclosure are described in further detail below.

DETAILED DESCRIPTION

The security key generation techniques disclosed herein may be used for various electronics devices such as wireless communication devices, handheld devices, game devices, computing devices, consumer electronics devices, computers, etc. For clarity, the techniques are described below for a wireless communication device.

Figure 1:
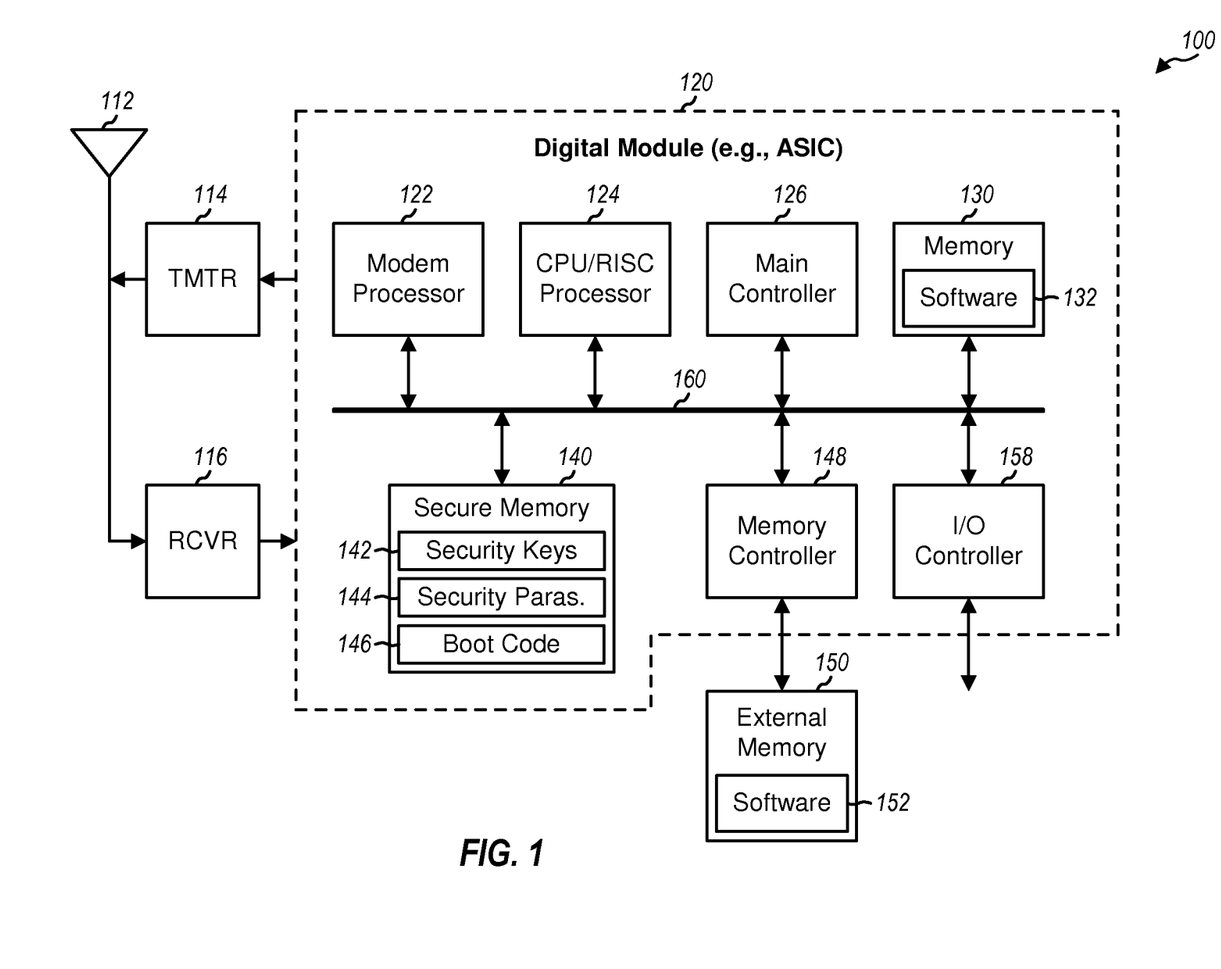
FIG. 1 shows a block diagram of a wireless device.

FIG. 1 shows a block diagram of an exemplary design of a wireless communication device 100 capable of implementing the security key generation techniques disclosed herein. Wireless device 100 may be a cellular phone, a smartphone, a tablet, a wireless modem, a personal digital assistant (PDA), a handheld device, a laptop computer, a smartbook, a netbook, a cordless phone, a wireless local loop (WLL) station, a Bluetooth device, etc. Wireless device 100 may support bi-directional communication with one or more wireless communication systems.

For data transmission, a digital module 120 may process (e.g., encode and modulate) data to be transmitted and provide an output baseband signal to a transmitter (TMTR) 114. Transmitter 114 may amplify, filter, and upconvert the output baseband signal to generate an output radio frequency (RF) signal, which may be transmitted via an antenna 112 to base stations.

For data reception, antenna 112 may receive signals from base stations and/or other transmitter stations and may provide a received RF signal to a receiver (RCVR) 116. Receiver 116 may downconvert the received RF signal from RF to baseband, filter and amplify the downconverted signal, and provide an input baseband signal to digital module 120. Digital module 120 may process (e.g., demodulate and decode) the input baseband signal to recover data sent to wireless device 100.

Digital module 120 may include various processing, interface, and memory units to support digital processing for wireless device 100. In the design shown in FIG. 1, digital module 120 includes a modem processor 122, a central processing unit (CPU)/reduced instruction set computer (RISC) processor 124, a main controller 126, an internal memory 130, a secure memory 140, a memory controller 148, and an input/output (I/O) controller 158, all of which may communicate with one another via one or more data buses 160.

Modem processor 122 may perform processing for data transmission and reception, e.g., encoding, modulation, demodulation, decoding, etc. CPU/RISC processor 124 may perform general-purpose processing for wireless device 100, e.g., processing for audio, video, graphics, and/or other applications. Main controller 126 may direct the operation of various units within digital module 120. Internal memory 130 may store software 132 and/or data used by the processors and controllers within digital module 120. Memory 130 may be implemented with static random access memory (SRAM) or other types of memory.

Secure memory 140 may store security keys 142, security parameters 144, a boot code 146, and/or other secure information. Security keys 142 may be used for security functions on wireless device 100, e.g., to encrypt data sent by wireless device 100, decrypt encrypted data sent to wireless device 100, authenticate software loaded into internal memory 130, etc. Security parameters 144 may control various aspects related to security of wireless device 100. Boot code 146 may perform secure boot to authenticate software loaded onto wireless device 100. Memory 140 may be implemented with a read-only memory (ROM), one-time programmable (OTP) elements, and/or other types of memory.

Memory controller 148 may facilitate transfer of data between an external memory 150 and digital module 120. External memory 150 may provide mass/bulk storage for the processing units within digital module 120. For example, memory 150 may store software 152 that can be loaded into digital module 120 for execution, data, etc. Memory 150 may comprise (i) bulk non-volatile memory such as NAND Flash and/or NOR Flash memory, (ii) bulk volatile memory such as synchronous dynamic random access memory (SDRAM) or dynamic random access memory (DRAM), and/or (iii) other types of memory. I/O controller 158 may allow wireless device 100 to communicate with secure servers and/or other entities.

FIG. 1 shows an exemplary design of digital module 120. In general, digital module 120 may include any number of processing, interface, and memory units. Digital module 120 may also be implemented with one or more digital signal processors (DSPs), micro-processors, RISC processors, etc. Digital module 120 may be implemented on one or more application specific integrated circuits (ASICs) and/or other integrated circuits (ICs).

An electronics device, such as wireless device 100, typically goes through a series of manufacturing steps. The electronics device may be vulnerable to security attack during one or more manufacturing steps.

Figure 2:
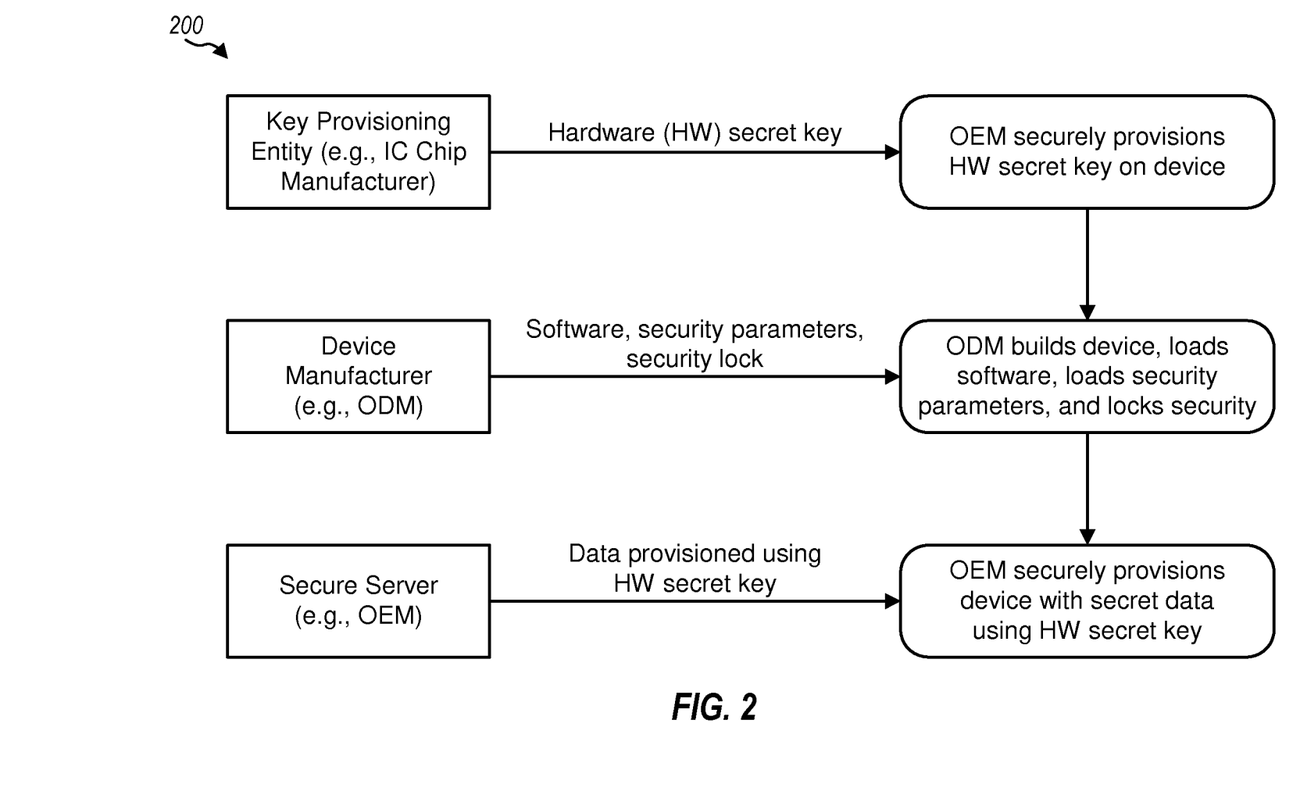
FIG. 2 shows an exemplary manufacturing process for the wireless device.

FIG. 2 shows an exemplary manufacturing process 200 for wireless device 100 (or any electronics device). A key provisioning entity may securely provision a hardware (HW) secret key on wireless device 100 (step 1). The key provisioning entity may be an integrated circuit (IC) chip manufacture of an IC chip (e.g., an ASIC) used in wireless device 100 (as shown in FIG. 2) or some other entity. The hardware secret key may be stored in secure memory 140 on wireless device 100.

A device manufacturer may manufacture or build wireless device 100 in an unsecured manufacturing environment where access to manufactured devices cannot be limited to only trusted employees. The device manufacturer may be an original device manufacturer (ODM) (as shown in FIG. 2), an original equipment manufacturer (OEM), or any entity that builds, assembles, and provisions wireless device 100. The device manufacturer typically loads software, loads security parameters, and enables security functions on wireless device 100 (step 2).

A secure server may provision wireless device 100 with secret data using the hardware secret key (step 3). Secure data provisioning is typically performed in a secure facility to load secret data onto wireless device 100. For secure data provisioning, the secure server may securely exchange data with wireless device 100 using the hardware secret key. The provisioned secret data may be stored in secure memory 140 on wireless device 100.

As shown in FIG. 2, security parameters may be loaded onto wireless device 100 during the manufacturing process. The security parameters may control various aspects of security on wireless device 100 and may include one or more of the following:

Information related to a root-of-trust (RoT) of the device,
Information that controls which software can execute on the device and/or how software can operate on the device,
Information that controls whether certain security features can be enabled or disabled on the device, and/or
Other security related information.

The security parameters may include information related to the root-of-trust of wireless device 100. The root-of-trust may be the foundation basis of all security mechanisms on wireless device 100. The root-of-trust related information may include one or more public root keys corresponding to one or more private root keys, one or more certificates for the public root key(s), etc. A private root key may be used to sign data sent to wireless device 100. A corresponding public root key may be used to authenticate data that has been signed with the private root key. For example, the public root key may be used in secure boot to authenticate software loaded onto wireless device 100, as described below.

The security parameters may control which software can execute on wireless device 100 and/or how software can operate on wireless device 100. For example, the security parameters may include a public key used to authenticate software authorized for execution on wireless device 100. The software may be signed based on a private key corresponding to the public key and may be stored on wireless device 100. The software may be authenticated based on the public key prior to execution on wireless device 100, as described below.

The security parameters may control whether certain security features can be enabled or disabled on wireless device 100. For example, the security parameters may control whether secure boot of wireless device 100 is enabled, whether debug capability of wireless device 100 can be disabled to allow access to internal states of wireless device 100 during testing or debug, etc.

Some security parameters may serve multiple purposes. For example, the public root key may serve as both the root-of-trust of wireless device 100 as well as to control which software can execute on wireless device 100.

The security parameters may be stored in secure memory 140 on wireless device 100. For example, the security parameters may be stored using OTP elements on an IC chip of a processor for wireless device 100. The OTP elements may be implemented with fuses that can be blown once during manufacturing to permanently store data via the state of the fuses.

Software and security information may be stored on wireless device 100 in a manner to allow wireless device 100 to authenticate the software prior to execution of the software. An exemplary security mechanism for authenticating software stored on wireless device 100 is described below.

Figure 3A:
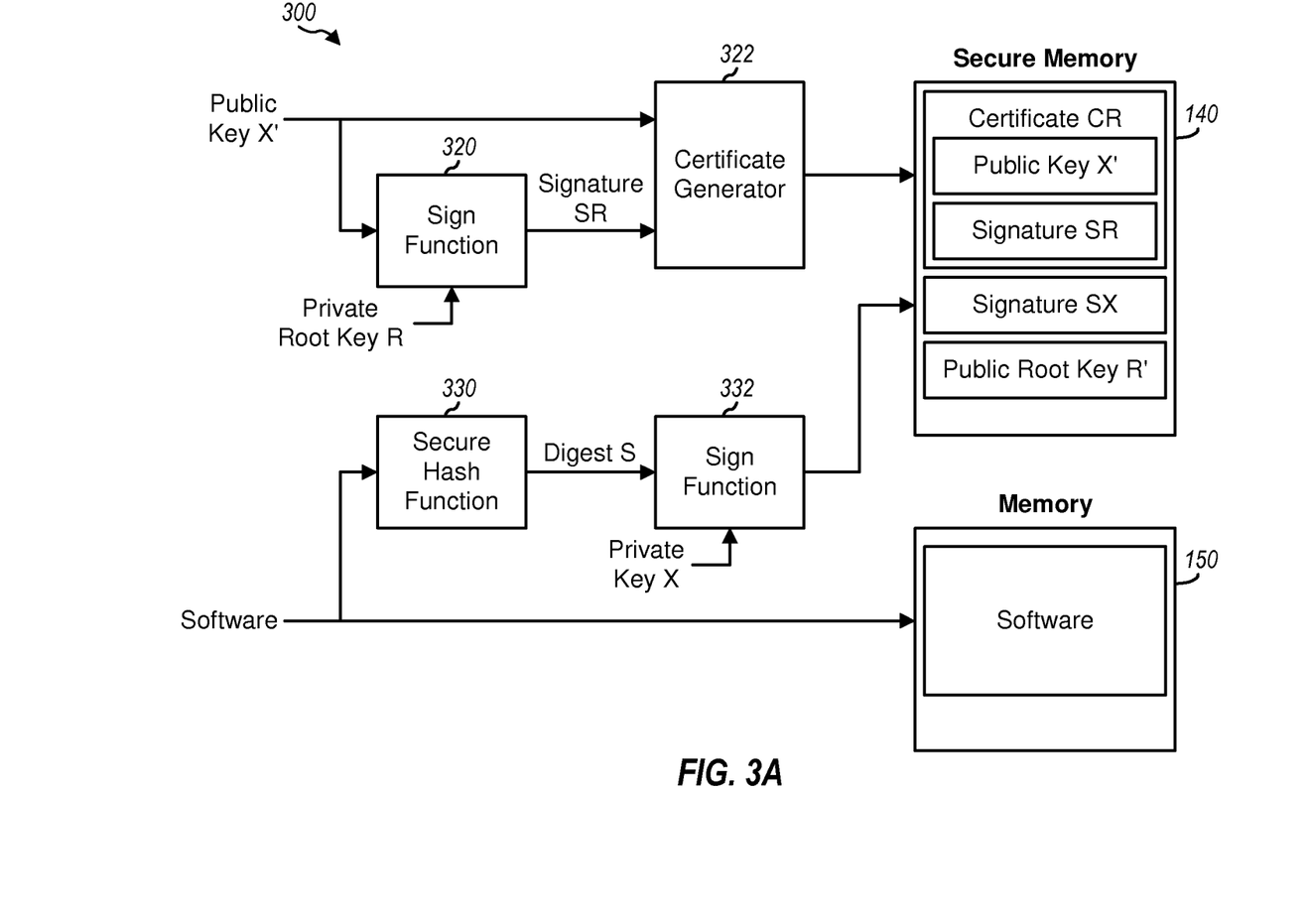
FIG. 3A shows a process for storing security information on the wireless device.

FIG. 3A shows an exemplary design of a process 300 for storing security information on wireless device 100 to support authentication of software loaded onto wireless device 100. Process 300 may be performed by a secure server or some other entity.

At the secure server, a sign function 320 may generate a digital signature SR over a public key X' and possibly other information using a private root key R. Signature SR may be used to authenticate a source entity, which is the secure server. Sign function 320 may implement an RSA (Rivest, Shamir and Adleman) algorithm, a Digital Signature Algorithm (DSA), or some other cryptographic (digital signature or encryption) algorithm. A certificate generator 322 may form a certificate CR containing public key X', signature SR, and possibly other information such as an identifier of the source entity, a cryptographic algorithm selected for use, an expiration date of the certificate, etc. This certificate may be stored as an X.509 certificate in secure memory 140 (or some other memory) on wireless device 100. Public root key R' may be made available to wireless device 100 in a secure manner and may be stored in secure memory 140 (e.g., an OTP memory or a ROM) on wireless device 100.

A secure hash function 330 may hash software loaded onto wireless device 100 and may provide a hash digest S. Secure hash function 330 may implement SHA-1, SHA-2, MD-5, or some other secure hash algorithm. A sign function 332 may generate a digital signature SX over digest S using private key X. Signature SX may be stored in memory 150. Sign function 332 may implement the RSA, DSA, or some other cryptographic algorithm. The software may be stored in memory 150 (or some other memory) on wireless device 100.

Figure 3B:
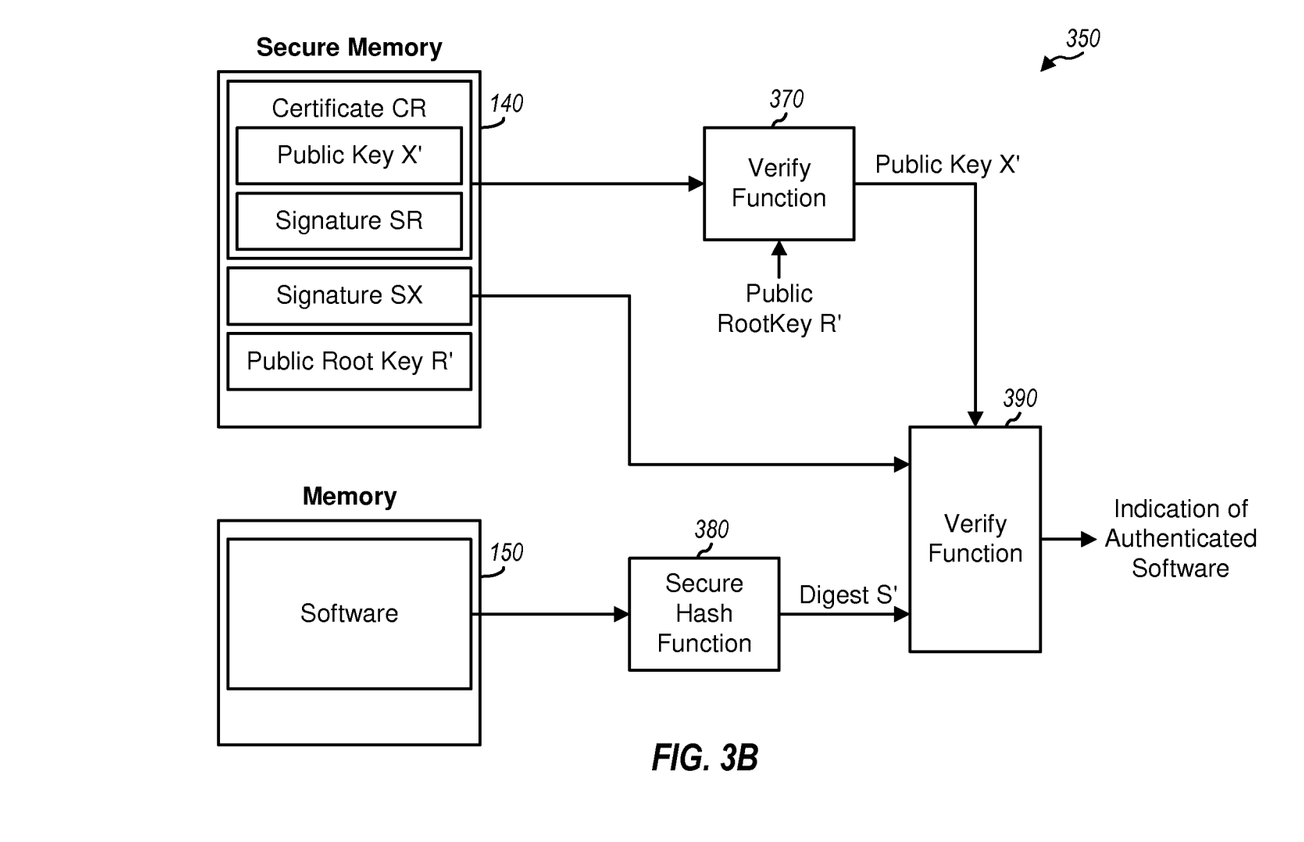
FIG. 3B shows a process for performing secure boot of the wireless device.

FIG. 3B shows an exemplary design of a process 350 for secure boot of wireless device 100. Process 350 may be performed by wireless device 100, as described below. At wireless device 100, a verify function 370 may receive certificate CR and public root key R' from secure memory 140. Verify function 370 may extract signature SR and public key X' from certificate CR, verify signature SR with public root key R', and provide public key X' if signature SR is verified. Any tampering with certificate CR by a third party can be easily detected by signature SR not verifying.

A secure hash function 380 may receive software from memory 150, hash the software, and provide a hash digest S'. Secure hash function 380 may implement the same secure hash algorithm used by secure hash function 330 in FIG. 3A. A verify function 390 may receive digest S' from secure hash function 380, digital signature SX from memory 150, and public key X' from verify function 370. Verify function 390 may verify digital signature SX with public key X' and digest S' and may indicate whether or not digital signature SX is verified. Public key X' is authenticated with public root key R'. Hence, any tampering with digital signature SX and/or the software by a third party can be easily detected by digital signature SX not verifying. If digital signature SX is verified, then the software may be provided for use. Otherwise, an error message may be provided.

FIG. 3A show an exemplary secure boot software signing process. FIG. 3B show an exemplary secure boot software authentication process. Secure boot may also be implemented in other manners.

During normal operation, wireless device 100 may perform secure boot to authenticate software loaded onto wireless device 100 prior to execution of the software. For the secure boot, wireless device 100 may first authenticate signature SR with public root key R' to determine the authenticity of public key X'. If public key X' is authenticated, then wireless device 100 may authenticate signature SX with public key X' to determine the authenticity of the software. The secure boot may ensure that only software that has been authorized for wireless device 100 can be executed on wireless device 100.

Hardware secret keys are commonly provisioned on ASICs such as system-on-chip (SoC) ICs and are used to encrypt and decrypt data stored in memories external to the ASICs. This security mechanism is also known as a secure file system or an encrypted file system. Hardware secret keys are typically separate from public/private keys. A hardware secret key is typically a symmetric key used to encrypt and decrypt secrets in a device. For example, a hardware secret key may be used to encrypt data before storing the encrypted data in a non-protected data storage such as a solid state disk (SSD), a MultiMediaCard (MMC), an eMMC, etc. Many OEMs do not trust their manufacturing floor employees or ODM employees. Hence, most security implementations do not allow software to have access to a hardware secret key on an ASIC. However, these security implementations typically allow the hardware secret key to be used indirectly by software. This usage may include decryption or encryption of data.

Software may be considered to be trusted after it has been authenticated and verified by an authentication mechanism that is tied to a root-of-trust (RoT) of the ASIC. This authentication mechanism is typically referred to as secure boot. However, secure boot may not be available during the manufacturing process.

It is common practice to provide an OEM/ODM with a generic ASIC in which a hardware secret key is provisioned, secure boot is not enabled, and root-of-trust is not provisioned. The hardware secret key may be provisioned in a secure memory on a device or the ASIC. At this stage, prior to enabling secure boot and/or other security mechanisms that can protect the integrity of software on the device, unauthorized software may be loaded onto the device and executed by the device. Any security key provisioned on the device may be manipulated by the unauthorized software. This opens the door for untrusted ODM/OEM manufacturing employees to manipulate data using the hardware secret key, expose confidential information, or compromise the integrity of data protected by the hardware secret key.

Wireless device 100 may thus be vulnerable to attack from (i) the time when the hardware secret key is provisioned on wireless device 100, e.g., by an IC chip manufacturer in step 1 in FIG. 2, to (ii) the time when security is locked on wireless device 100, e.g., by the OEM in step 3 in FIG. 2. During this vulnerable time period, unauthorized software may be maliciously loaded onto wireless device 100 and executed by the wireless device to (i) access the hardware secret key and/or (ii) manipulate data using the hardware secret key, e.g., in cases where the hardware secret key is not accessible by software on wireless device 100.

In an aspect of the present disclosure, security of a device may be improved (and security weakness described above may be effectively addressed) by generating a working key based on a hardware secret key as well as at least one security parameter, which may be related to software authorized for the device. The working key (instead of the hardware secret key) may be used to encrypt and/or decrypt data on the device.

Figure 4:
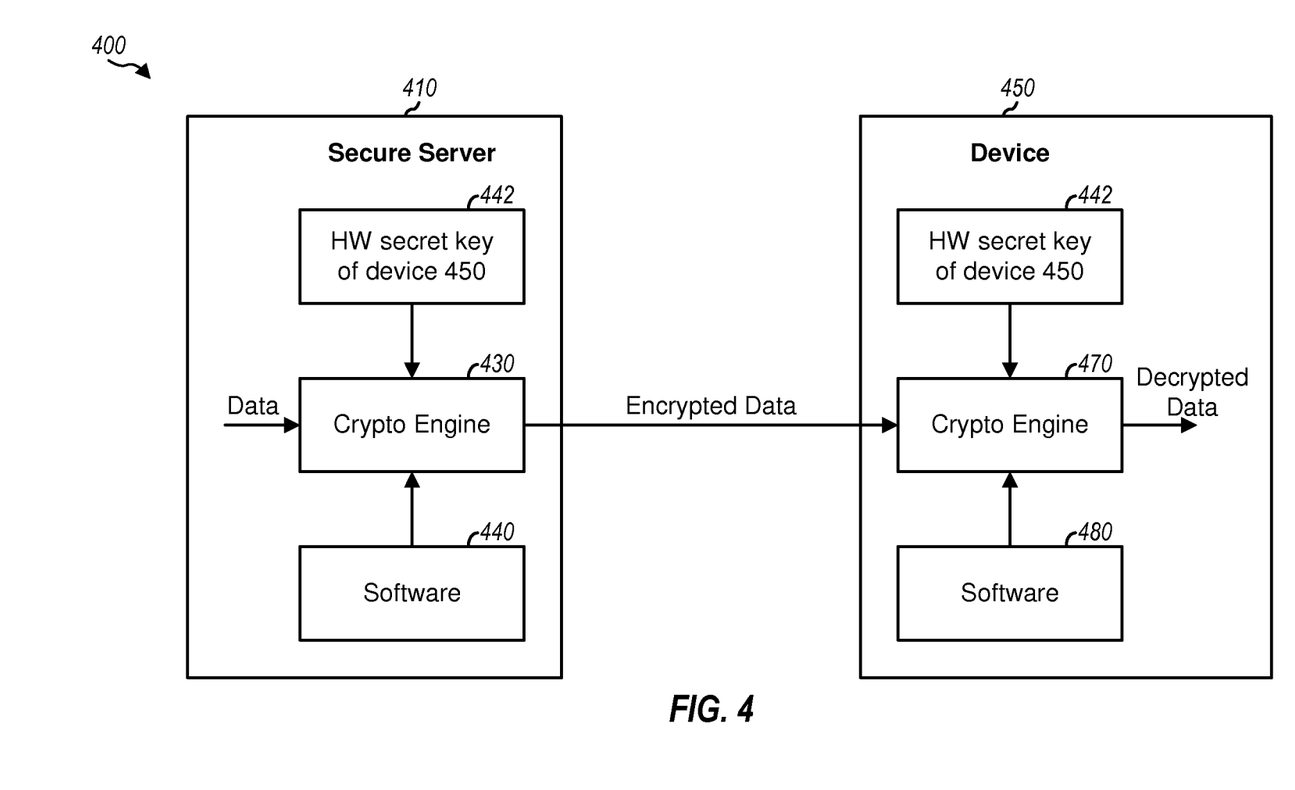
FIG. 4 shows a process for encrypting and decrypting data based on a hardware secret key.

FIG. 4 shows a process 400 for encrypting and decrypting data in a conventional manner based on a hardware secret key. At a secure server 410 (which may belong to an OEM), a crypto engine 430 may encrypt data with a hardware secret key 442 of a device 450 to obtain encrypted data. Crypto engine 430 may operate as directed by software 440 in secure server 410. The encrypted data may be sent to device 450.

At device 450, a crypto engine 470 may receive the encrypted data from secure server 410 and may decrypt the encrypted data with hardware secret key 442 of device 450. Crypto engine 470 may operate as directed by software 480 in device 450. As noted above, software 480 may be insecure prior to enabling of secure boot on device 450. In this case, malicious software may be loaded onto device 450 and may be executed to (i) direct crypto engine 470 to decrypt the encrypted data and/or (ii) manipulate the decrypted data.

Figure 5:
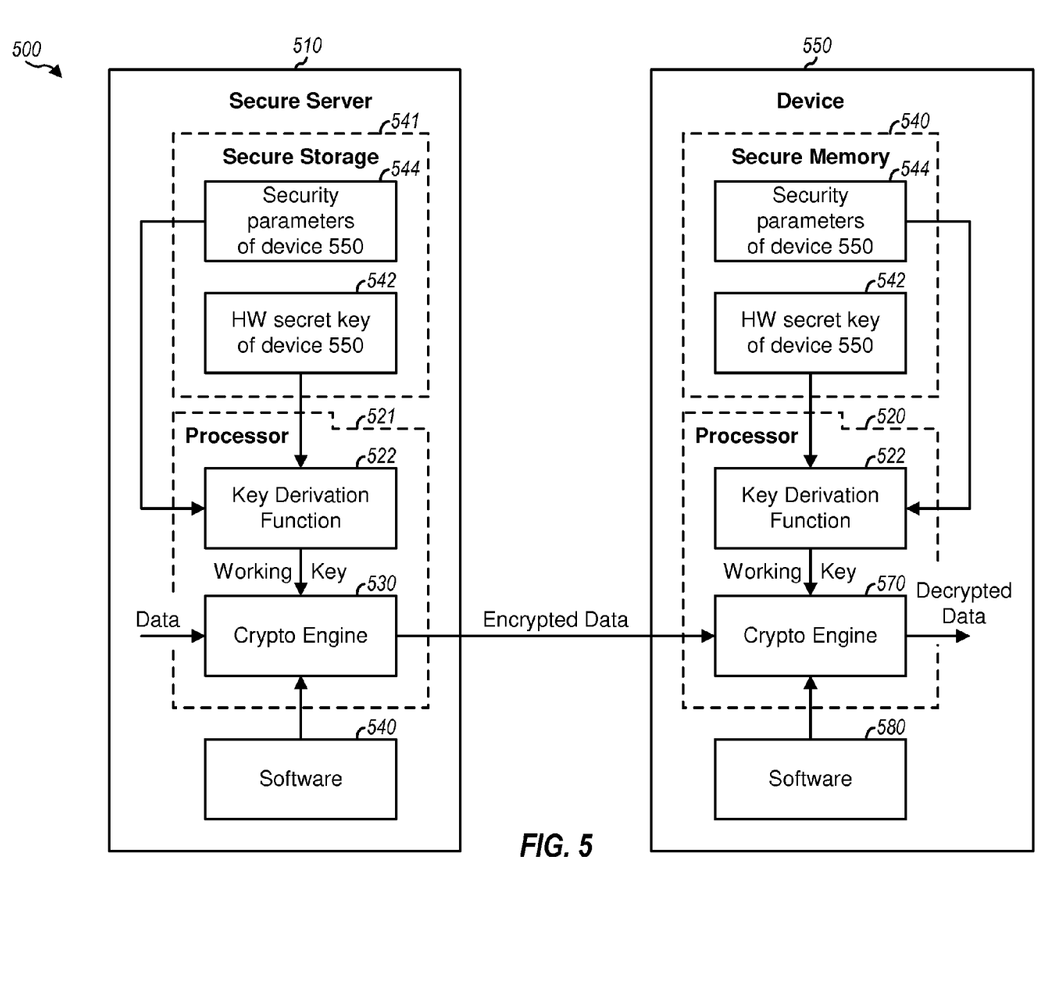
FIG. 5 shows a process for encrypting and decrypting data based on a working key.

FIG. 5 shows an exemplary design of a process 500 for encrypting and decrypting data in a novel manner based on a working key. At a secure server 510, a one-way key derivation function (KDF) 522 may generate a working key for a device 550 based on a hardware secret key 542 and at least one security parameter 544, which may be related to software authorized on device 550. A crypto engine 530 may encrypt data with the working key to obtain encrypted data, which may be sent to device 550.

At device 550, key derivation function 522 may generate the working key for device 550 based on hardware secret key 542 and at least one security parameter 544 of device 550. A crypto engine 570 may receive the encrypted data from secure server 510 and may decrypt the encrypted data with the working key to obtain decrypted data.

At secure server 510, hardware secret key 542 and/or security parameters 544 may be stored in a secure storage 541 within secure server 510. Key derivation function 522 and crypto engine 530 may be implemented with hardware, software, and/or firmware and may be implemented by (e.g., executed on) a processor 521 within secure server 510.

At device 550, hardware secret key 542 and/or security parameters 544 may be stored in a secure memory 540 of device 550. For example, secure memory 540 may comprise an OTP memory, and hardware secret key 542 and/or security parameters 544 may be stored by blowing fuses of the OTP memory. Key derivation function 522 and crypto engine 570 may be implemented with hardware, software, and/or firmware and may be implemented by (e.g., executed on) a processor 520 within device 550. Device 550 may be one exemplary design of wireless device 100 in FIG. 1. Secure memory 540 may correspond to secure memory 140 within wireless device 100 in FIG. 1. Processor 520 may correspond to processor 122 or 124 within wireless device 100 in FIG. 1.

Various key derivation functions may be used for key derivation function 522 at secure server 510 and device 550. A key derivation function may utilize one or more cryptographic hash functions such as SHA-1 (Secure Hash Algorithm), SHA-2 (which includes SHA-224, SHA-256, SHA-384 and SHA-512), MD-4 (Message Digest), MD-5, etc. A secure hash algorithm has cryptographic properties so that the function between an input message and an output digest (which is a pseudo-random bit string) is irreversible and the likelihood of two input messages mapping to the same digest is very small. Key derivation function 522 may be implemented as described in NIST 800-108, which is publicly available.

As show in FIG. 2, security parameters (e.g., root-of-trust related security information and secure boot related security information) may be provisioned in a secure memory of a wireless device as part of a manufacturing process. The provisioning of security parameters is typically done after a hardware secret key is already provisioned on the wireless device. The security parameters are typically not secret and may be provisioned by unauthorized entities (e.g., manufacturing employees).

As shown in FIG. 5, a key derivation function may be used to generate a working key based on the hardware secret key and at least one security parameter provisioned on the device. The security parameter(s) may relate to software authorized for the device. The security parameter(s) may also determine a system security level and/or a specific root-of-trust on the device. The working key may be properly generated after the security parameter(s) have been provisioned on the device, e.g., by an OEM. The working key may be used by the OEM to protect secret data. Unauthorized software may be maliciously loaded onto the device prior to provisioning of security parameters on the device. However, the unauthorized software would not be able to generate the correct working key without the right set of security parameters. Furthermore, incorrect security parameters may be loaded onto the device by an unauthorized entity, e.g., an untrusted employee. However, the correct working key would not be generated without the right set of security parameters, and data would still be protected. In any case, software unable to utilize the correct working key would be unable to properly encrypt or decrypt data on the device.

Figure 6:
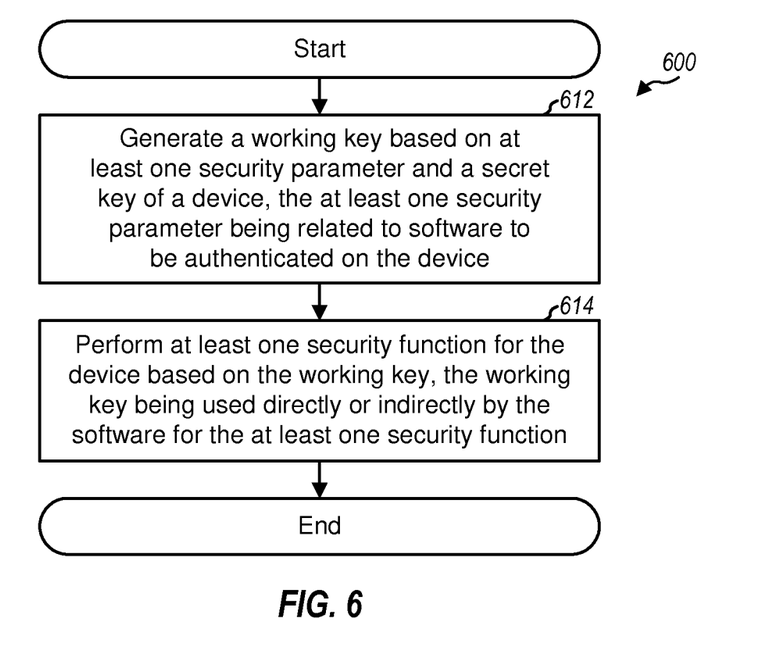
FIG. 6 shows a process for providing security for a device.

FIG. 6 shows an exemplary design of a process 600 for providing security. Process 600 may be performed by a device, or a secure server, or some other entity. A working key may be generated based on at least one security parameter and a secret key (e.g., a hardware secret key) of the device (e.g., with a key derivation function) (block 612). The at least one security parameter may be related to software to be authenticated on the device and/or other aspects of security for the wireless device. At least one security function may be performed for the device based on the working key (block 614). The working key may be used directly or indirectly by the software for the at least one security function. The at least one security parameter and/or the secret key may be stored in a secure memory on the device, e.g., in OTP elements.

The at least one security parameter may control various aspects of security for the device. In one design, the at least one security parameter may determine whether the software (or which software) is authorized for execution on the device. In another design, the at least one security parameter may determine at least one operating function authorized for the software on the device (or how software can be used on the device). In yet another design, the at least one security parameter may comprise a public key used to determine whether the software is authorized for the device. The public key may correspond to a private key used to sign the software, e.g., as shown in FIGS. 3A and 3B. The at least one security parameter may also comprise other types of information.

In one design, the secret key may be loaded onto the device by a first entity (e.g., an IC chip manufacturer, during the manufacturing of an IC chip). The at least one security parameter may be loaded onto the device by a second entity (e.g., an OEM or an ODM device manufacture), which may be different from the first entity. In one design, the secret key and the at least one security parameter may be loaded onto the device at different times. The secret key and the at least one security parameter may have other characteristics that are different.

In one design of block 614, data for the device may be encrypted or signed with the working key. In another design of block 614, data for the device may be decrypted or verified with the working key. In one design, the at least one security function may be performed under control of the software.

The at least one security function may be performed by the software prior to activation of a secure mechanism (e.g., a secure boot) to authenticate the software. The use of the working key may enable the software to be executed on the device without authenticating the software via the secure mechanism.

In an exemplary design, an apparatus (e.g., an ASIC, a wireless device, an electronics device, etc.) may include a memory and a processor. The memory (e.g., memory 150 in FIG. 1) may store software for a device. The processor (e.g., processor 122 or 124 in FIG. 1) may be operatively coupled to the memory (e.g., via one or more data buses). The processor may (i) generate a working key based on at least one security parameter and a secret key of the device and (ii) perform at least one security function (e.g., encryption, decryption, signature, verification, etc.) for the device based on the working key. The processor may perform the at least one security function prior to activation of a secure mechanism (e.g., a secure boot) to authenticate the software. The at least one security parameter may be related to authentication of the software stored in the memory. The working key may be used directly or indirectly by the software for the at least one security function. The secret key and the at least one security parameter may be loaded onto the device by different entities and/or at different times. A first entity may load the secret key onto the device, and a second entity may later load the at least one security parameter onto the device. The first entity may be an IC chip manufacture, and the second entity may be an OEM or ODM. Alternatively, the first entity may be a trusted employee, and the second entity may be a non-trusted employee, e.g., on the same manufacturing floor or at different locations. The apparatus may further include a secure memory that stores the secret key and/or the at least one security parameter. The at least one security parameter may also be stored in an unsecure memory on the apparatus, as long as the integrity of the at least one security parameter is protected by the memory.

The security key generation techniques disclosed herein may provide various advantages. The techniques may prevent unauthorized software from utilizing a hardware secret key or manipulating data during a vulnerable time period in manufacturing prior to activation of secure boot. This may relieve an OEM/ODM from having to implement various processes to secure a manufacturing floor. There may be other advantages provided by the techniques disclosed herein.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but is to be accorded the widest scope consistent with the principles and novel features disclosed herein.

What is claimed is:

1. A method of providing security, comprising:
generating by software a working key based on at least one security parameter of a set of security parameters and a secret key of a device, the set of security parameters and the secret key having been provisioned and stored on the device by at least two different entities, the software being authorized for execution on the device according to the set of security parameters, wherein the at least one security parameter determines at least one operating function authorized for the software on the device; and
performing at least one security function for the device based on the working key, the working key being used directly or indirectly for the at least one security function.

2. The method of claim 1, the at least one security parameter comprising a public key used to determine whether the software is authorized for the device.

3. The method of claim 2, the public key corresponding to a private key used to sign the software.

4. The method of claim 1, the secret key and the at least one security parameter being loaded onto the device at different times.

5. The method of claim 1, the generating a working key comprises generating the working key based on the at least one security parameter and the secret key of the device with a key derivation function.

6. The method of claim 1, the performing at least one security function comprises encrypting or signing data for the device with the working key.

7. The method of claim 1, the performing at least one security function comprises decrypting or verifying data for the device with the working key.

8. The method of claim 1, the performing at least one security function comprises performing the at least one security function under control of the software.

9. The method of claim 1, further comprising:
executing the software on the device without authenticating the software via a secure mechanism.

10. The method of claim 1, further comprising:
storing the secret key in a secure memory on the device; and
storing the at least one security parameter in the secure memory or an unsecure memory on the device.

11. An apparatus comprising:
means for generating by software a working key based on at least one security parameter and a secret key of a device, the set of security parameters and the secret key having been provisioned and stored on the device by at least two different entities, the software being authorized for execution on the device according to the set of security parameters, wherein the at least one security parameter determines at least one operating function authorized for the software on the device; and
means for performing at least one security function for the device based on the working key, the working key being used directly or indirectly for the at least one security function.

12. The apparatus of claim 11, the secret key and the at least one security parameter being loaded onto the device at different times.

13. The apparatus of claim 11, the means for performing at least one security function comprising means for performing the at least one security function prior to activation of a secure mechanism to authenticate the software.

14. An apparatus comprising:
a memory configured to store software for a device; and
a processor coupled to the memory and configured to:
generate by software a working key based on at least one security parameter of a set of security parameters and a secret key of the device, the set of security parameters and the secret key having been provisioned and stored on the device by at least two different entities, the software being authorized for execution on the device according to the set of security parameters, wherein the at least one security parameter determines at least one operating function authorized for the software on the device; and
perform at least one security function for the device based on the working key, the working key being used directly or indirectly for the at least one security function.

15. The apparatus of claim 14, the secret key and the at least one security parameter being loaded onto the device at different times.

16. The apparatus of claim 14, the at least one processor being configured to perform the at least one security function prior to activation of a secure mechanism to authenticate the software.

17. A computer program product, comprising:
a non-transitory computer-readable medium comprising:
code for causing at least one computer to generate by software a working key based on at least one security parameter of a set of security parameters and a secret key of a device, the set of security parameters and the secret key having been provisioned and stored on the device by at least two different entities, the software being authorized for execution on the device according to the set of security parameters, wherein the at least one security parameter determines at least one operating function authorized for the software on the device; and
code for causing the at least one computer to perform at least one security function for the device based on the working key, the working key being used directly or indirectly by software for the at least one security function.

18. The computer program product of claim 17, the secret key and the at least one security parameter being loaded onto the device at different times.

19. The computer program product of claim 17, the code for causing the at least one computer to perform at least one security function comprising code for causing the at least one computer to perform the at least one security function prior to activation of a secure mechanism to authenticate the software.

* * * * *